United States Patent
Osawa

[19]

[11] Patent Number: 6,125,098
[45] Date of Patent: Sep. 26, 2000

[54] DISK DRIVE MOTOR

[75] Inventor: Harushige Osawa, Kusatsu, Japan

[73] Assignee: Nidec Corporation, Kyoto, Japan

[21] Appl. No.: 09/159,357

[22] Filed: Sep. 23, 1998

[30] Foreign Application Priority Data

Sep. 26, 1997 [JP] Japan .................................... 9-279761

[51] Int. Cl.$^7$ .................................................. G11B 19/20
[52] U.S. Cl. ............................................ 369/266; 369/263
[58] Field of Search .................................... 369/269, 264, 369/258, 176, 263, 270; 360/98.08, 99.12, 98.07

[56] References Cited

U.S. PATENT DOCUMENTS

| | | | |
|---|---|---|---|
| 3,720,415 | 3/1973 | Daniels et al. ........................... | 369/258 |
| 3,854,347 | 12/1974 | Hellerich ............................... | 74/573 R |
| 3,992,576 | 11/1976 | Sugiura ................................ | 369/44.15 |
| 5,001,700 | 3/1991 | Rowden ................................ | 369/270 |
| 5,111,713 | 5/1992 | Cameron et al. ...................... | 74/573 R |
| 5,422,776 | 6/1995 | Thorson et al. ....................... | 360/98.07 |
| 5,463,613 | 10/1995 | Forsell ................................. | 369/266 |
| 5,540,615 | 7/1996 | Murtuza ............................... | 451/343 |
| 5,555,144 | 9/1996 | Wood et al. .......................... | 360/98.08 |
| 5,903,540 | 5/1999 | Ro et al. .............................. | 369/263 |
| 6,005,746 | 12/1999 | Papst .................................. | 360/98.07 |
| 6,005,749 | 12/1999 | Ikuta et al. ........................... | 360/99.12 |
| 6,021,865 | 2/2000 | Reichenbach ......................... | 198/379 |
| 6,061,325 | 5/2000 | Zaun .................................... | 369/264 |
| 6,065,368 | 5/2000 | Sohn .................................... | 74/573 R |

FOREIGN PATENT DOCUMENTS

| | | | |
|---|---|---|---|
| 0428218 | 5/1991 | European Pat. Off. ............... | 369/269 |
| 0182127 | 10/1983 | Japan .................................... | 369/269 |
| 0052953 | 3/1985 | Japan .................................... | 369/269 |
| 0117759 | 6/1986 | Japan .................................... | 369/269 |
| 0225656 | 10/1991 | Japan .................................... | 369/269 |
| 08303467 | 11/1996 | Japan . | |

*Primary Examiner*—David L. Ometz
*Assistant Examiner*—Franklin D. Altman
*Attorney, Agent, or Firm*—McCormick, Paulding & Huber LLP

[57] ABSTRACT

The present invention discloses a disk drive motor comprising a rotary member having an annular space formed therein coaxially with the axis of rotation, and ring-shaped balancing members accommodated in the annular space and capable of changing its mass distribution circumferentially along the circle of the annular space. In case of any imbalanced rotation occurring during the rotation, the balancing members temporarily gather at a portion of the annular space where the mass imbalance is taking place. When the motor speed exceeds the value at which resonance takes place due to coincidence between the frequency of the vibration of each of the balancing member and the natural frequency of the motor, the balancing members move to a position symmetrical with the point of mass imbalance to eliminate the mass imbalance, thereby reducing motor run-out.

18 Claims, 6 Drawing Sheets

DISK DRIVE MOTOR

BACKGROUND OF THE INVENTION

1. Field of the Invention

The present invention relates to a drive motor for recording disks and, more particularly, to a disk drive motor which is required to operate at high speed with high stability.

2. Description of the Related Art

Various types of recording disks have been proposed and used for the purpose of recording and reproduction of data, such as compact disks (CD), floppy disks (FD), magneto-optical disks (MO), mini-disks (MD), digital video disks (DVD), hard disks (HD), and so forth. Different types of recording disks employ different recording/reproduction methods and have different specifications in regard to the size or capacity of stored data, disk driving speed, recording density, and so on, as well as disk materials and prices. Consequently, drive motors of different specifications are used for driving different types of recording disks.

Nowadays, there is a trend towards a higher degree of sophistication and greater volume of electronic data, as image data are handled more than text data. This has given rise to the demand for inexpensive recording disks and disk drives, which are capable of performing quick storage and reproduction of large volumes of information.

For instance, CDs were initially used as music recording/playback media, but are now used as CD-ROMs which are major storage disks for computers, by virtue of their advantages over other types of media. This type of storage media offers greater storage capacity and shorter operation time, i.e., reduced seek time, permitting much higher speed of rotation by means of high-speed disk drive motors, thus affording disk rotation speeds 20 times as high as that of music CDs.

PRIOR ART

FIG. 6 shows the construction of a conventional disk drive motor.

The conventional disk drive motor shown in FIG. 6 has a substantially cylindrical sleeve 3 which at its lower end fits in an opening 2 formed on a base member 1 as a part of a chassis of a disk drive device. The lower opening of the sleeve 3 is closed by a tabular member 4 which carries a thrust member 5. A sleeve bearing 6 made of an oil-impregnated metal or a wear-resistant resin is received in the sleeve 3.

A stator 8 includes a core 8a which is secured to the outer surface of the sleeve 3 and stator coils 8b are wound therearound. A shaft 9 is rotatably supported by the sleeve bearing 6 in contact at its lower end with the thrust member 5 while its upper end projects beyond the upper end of the sleeve 3. A rotor hub 10 made of non-magnetic material such as aluminum is fixed to the upper end of the shaft 9. A yoke 11 made of magnetic material such as iron is fixed to the rotor hub 10.

The yoke 11 has a disk-shaped base portion and a cylindrical portion which is integrally formed with the base portion and extends downwardly from the radially outer end of the base portion. The sleeve 3 is received in a central opening formed at the center of the base portion of the yoke 11. The inner peripheral edge of the base portion defining the central opening is fixed to a lower end portion of the rotor hub 10. An annular rotor magnet 12 is fixed to the inner peripheral surface of the cylindrical portion of the yoke 11, so as to radially face the stator 8.

A turntable 14 which is secured to the outer peripheral surface of the rotor hub 10 carries a recording disk D, through an intermediary buffer member 15. A clamp magnet 16 is provided in a recess formed on the top of the rotor hub 10, such that the upper surface of the clamp magnet 16 is flush with the top surface of the rotor hub 10. The clamp magnet 16 magnetically attracts a disk pressing means (not shown) on the disk drive unit, thereby fixing the recording disk D.

In operation, electrical current supplied to the coils 8b of the stator 8 serves to generate magnetic force which acts between the stator 8 and the rotor magnet 12 so as to induce a torque for rotation. As a consequence, the rotor magnet 12, the yoke 11, the rotor hub 10 and the shaft 9 rotate as a unit, relative to the stator 8 which is stationary, whereby the turntable 14 and, hence, the recording disk D thereon rotate in a predetermined direction.

When such a conventional motor is driven at high speed, there occurs a problem, which is not serious when the conventional motor is driven at low speed. Namely, high speed rotation of the motor makes it difficult to control and regulate motor performance such as run-out of the rotary part, vibration and noise of the motor. When run-out of the rotary part increases, storage and reproduction of data become less reliable.

Run-out, vibration and noise are attributable to slight local dimensional errors which produce only negligibly small effect in low speed operation but show serious effect on high speed operation as described above, resulting in imbalance of motor parts under rotation.

It is true that rotational performance of a conventional motor structure shown in FIG. 6 can be improved to some extent when, for example, the shaft 9 and the sleeve bearing 6 are machined, finished and mounted with a high degree of precision. This solution, however, is unsatisfactory from the viewpoint of production costs.

Rotational performance is also affected by any dimensional error of the recording disk, particularly when the rotation speed is high. When production costs are considered, it is difficult and impractical to achieve a higher dimensional precision of recording disks.

To solve the above-described problems, disk drive motors may be provided with a balancer, such as shown in FIG. 7. A balancer comprises an annular groove which opens downwardly and is formed on the lower surface of the turntable 14 which, as seen in FIG. 6, serves as a rotating member. The top surface of the yoke 11 covers the annular groove to form an annular space 18 which is concentric with the axis of rotation of the motor. A plurality of steel balls 19, for example, are movably accommodated in the annular space 18. In such a balancer, when the motor speed is low, the steel balls are positioned randomly in the annular space 18. When the speed exceeds a predetermined value, centrifugal force causes the steel balls to be spaced at equal intervals along the outer peripheral portion of the annular space. In case of any imbalance occurring during the rotation, the steel balls 19 temporarily gather, as shown in FIG. 7 to a portion of the annular space where the imbalance is taking place. However, when the motor speed exceeds a resonance speed at which resonance takes place due to coincidence between the frequency of the each steel ball 19 and the natural frequency of the motor, the steel balls 19 move to a location which is radially opposite to the location of imbalance (indicated by slanted lines in FIG. 7) to eliminate the imbalance, thereby reducing the run-out.

However, since the steel balls 19 move randomly within the annular space 18 until the motor speed reaches the predetermined speed, they come into contact with each other or with the peripheral walls of the annular space 18, thus, the balancer shown in FIG. 7 causes the problem of noise and vibration.

Further, in the case of the balancer shown in FIG. 7, frictional force, which acts in a direction opposite from the direction of rotation of the motor, is generated by the contact between the steel balls 19 and the peripheral walls defining the annular space 18. Unstable vibration and/or run-out may be caused at the turntable 14 which serves as a rotational member by the composition of the frictional force acting on each steel ball 19.

SUMMARY OF THE INVENTION

Accordingly, it is an object of the present invention to provide a disk drive motor which is driven with high stability at high speed.

Another object of the present invention is to provide a disk drive motor that offers high rotational performance despite dimensional errors of the motor and disk.

A still further object of the present invention is to provide a small and thin disk drive motor, which is provided with a balancer.

It is still another object of the present invention to provide a disk drive motor, which can be manufactured at low production costs but yet is capable of operating with high rotational performance.

An aspect of a disk drive motor according to the present invention may comprise a rotor having an annular space formed therein symmetrically with the axis of rotation, and ring-shaped balancing members movably accommodated in the annular space.

A plurality of ring-shaped balancing members are provided to move in a direction perpendicular to the axis of rotation of the rotor with either part of the inner peripheral portion or part of the outer peripheral portion of the balancing members being in contact with the peripheral walls defining the annular space. After the motor starts to rotate, the balancing members start to rotate by the frictional force generated between the balancing members and the lower and peripheral walls that define the annular space. The balancing members rotate in synchronism with the motor until the speed of rotation reaches a predetermined value. When the speed of rotation exceeds the predetermined value, they move to the outermost peripheral portion of the annular space by centrifugal force. When an imbalance occurs during the rotation, the balancing members temporarily move to a location where the imbalance is taking place. However, when the motor speed exceeds a resonance speed at which resonance takes place due to coincidence between the frequency of the each balancing member and the natural frequency of the motor, the balancing members move to a location which is symmetrical with the location of imbalance with respect to the axis of rotation to eliminate the imbalance, thereby reducing the run-out.

Since the ring-shaped balancing members are provided to move in a direction perpendicular to the axis of rotation of the rotor, the distance through which they move with respect to the center of gravity of rotation is less than that through which the steel balls move along the peripheral walls of the annular space, thereby making it easier for the balancing members to move to the proper balancing location, and attaining higher precision of balancing. In addition, since the balancing members are formed in a ring-shape, unlike the steel balls, they do not move randomly in the annular space, thereby preventing the generation of noise and vibration.

The direction of frictional force generated by the contact of the inner peripheral portion of the balancing member with the peripheral wall of the annular space is opposite to the direction of frictional force generated by the contact of the outer peripheral portion of the balancing member with the peripheral wall of the annular space, with respect to the center of gravity of the rotor and those frictional force being counter-balanced by each other, thereby allowing the rotor to rotate stably without causing run-out.

The above and other objects, features and advantages of the present invention will become clear from the following description of the preferred embodiments when the same is read in conjunction with the accompanying drawings.

DETAILED DESCRIPTION OF THE PREFERRED EMBODIMENTS

A description will now be given of a first embodiment of the present invention with specific reference to FIGS. 1 and 2.

Figure 1:
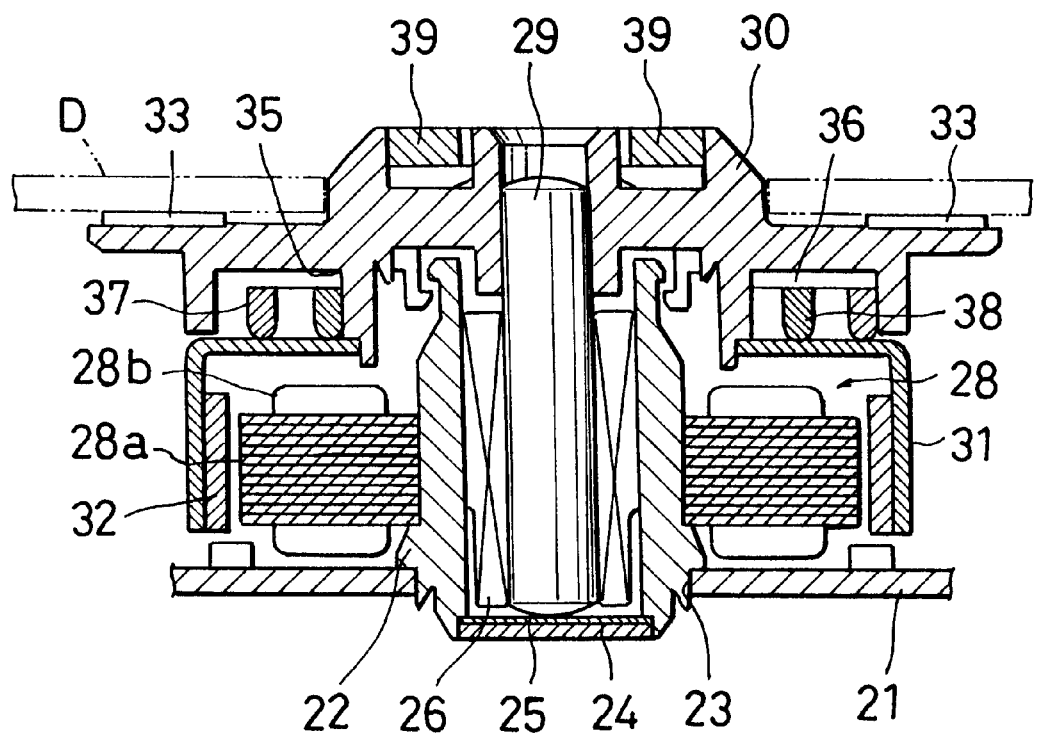
FIG. 1 is a sectional view of a first embodiment of the disk drive motor according to the present invention.

With reference to FIG. 1, a disk drive motor of the first embodiment has a stationary member 21 as a part of a chassis of a disk driving device and a stationary cylindrical sleeve member 22 which is secured at its lower end to the brim of an opening 23 formed in the stationary member 21. A circular plate member 24 is fixedly secured to the bottom opening of the sleeve member 22 to close the opening. A thrust member 25 is fixed to the upper surface of the circular plate member 24 so as to be positioned at the bottom of the sleeve member 22. And a sleeve bearing 26 which is made of an oil-impregnated metal or a wear-resistant resin, is secured to the inner peripheral surface of the sleeve member 22.

The disk drive motor also has a stator 28 which includes a core 28a fixed to the outer surface of the sleeve member 22 and coils 28b wound around the stator core 28a, and a shaft 29. The lower end of the shaft 29 is held in contact with the thrust member 25 and the upper end of the shaft 29 projects beyond the upper end of the sleeve member 22. The shaft 29 serves as a part of a rotary member rotatably supported by the sleeve bearing 26. A turntable 30 made of a non-magnetic material such as aluminum is attached to the upper end of the shaft 29 and also serves as a part of the rotary member.

A yoke 31 is made of magnetic material such as iron and has a disk-shaped base portion and a cylindrical portion integrally formed with the base portion and extending downward from the radially outer end thereof. The sleeve 22 is positioned within an opening formed at the central portion of the base portion of the yoke 31. The inner peripheral edge of the base portion defining the opening is secured to a lower end portion of the turntable 30. A rotor magnet 32 is fixedly secured to the inner peripheral surface of the cylindrical portion of the yoke 31 so as to oppose the stator 28. A recording disk D such as a CD-ROM is mounted on the upper surface of the turntable 30 through an intermediary buffer member 33.

The turntable 30 is formed with an annular recess 35 on its bottom. The lower opening of the annular recess 35 is covered by the upper surface of the base portion of the yoke 31, whereby a closed annular space 36 is formed.

Referring to FIG. 1, reference numeral 37 denotes a first ring as a first annular balancing member accommodated in the annular space 36. As shown in FIG. 2, the diameter of the first ring 37 is larger than the outside diameter Li of the inner peripheral wall of the annular space 36, but less than the inside diameter Lo of the outer peripheral wall of the annular space 36. The outer peripheral surface of the first ring 37 is shown in contact with the surface of the outer peripheral wall defining the annular space 36.

Referring again to FIG. 1, reference numeral 38 denotes a second ring as a second annular balancing member accommodated in the annular space 36. As shown in FIG. 2, the diameter of the second ring 38 is larger than the outside diameter Li of the inner peripheral wall of the annular space 36, but less than the inside diameter Lo of the outer peripheral wall of the annular space 36. The inner peripheral surface of the second ring 38 is shown in contact with the surface of the inner peripheral wall defining the annular space 36. Both of the rings 37 and 38 are made of either a metal or resin. And the lower surface of each of the rings 37 and 38 is curved, as shown in FIG. 1, for better slidability, thereby reducing resistance caused by friction.

Referring further to FIG. 1, a clamp magnet 39 is provided within a recess formed on the top of the turntable 30 such that the upper surface of the clamp magnet 39 is substantially flush with the top surface of the turntable 30. The clamp magnet 39 is adapted to magnetically attract disk pressing means (not shown) provided on the disk driving device, thereby stably fixing the recording disk D.

When current is supplied to the coils 28b of the stator 28, a magnetic force which acts between the stator 28 and the rotor magnet 32 is induced. As a result, the rotor magnet 32, the yoke 31, the turntable 30 and the shaft 29 rotate relative to the stator 28 which is kept stationary, whereby the disk D is rotated in a predetermined direction.

A description will now be given of the operation of the balancing members 37 and 38, when the recording disk D, such as a CD-ROM, is mounted with respect to a motor.

When imbalance exists in the rotation of the rotary member, after the motor is started, the rings 37 and 38 start to rotate by frictional force generated between the wall surfaces of the annular space 36 and the yoke 31. The motor vibrates due to the imbalance caused by recording disk D, mounted on the motor. Until the rotational speed of the motor exceeds the resonance speed, the motor rotates such that the phase at which the imbalance is taking place is oriented outwardly. Centrifugal force, or a force which is directed outwardly, is always acting on both of the rings 37 and 38, so that the center of gravity of both of the rings 37 and 38 tries to move outwardly within the annular space 36 as much as possible. However, since the center of gravity of the rings 37 and 38 moves toward a location where vibration is large, that is toward a location where the imbalance is taking place, the vibration of the motor becomes even greater.

At the rated rotational speed above the resonance speed of the motor, a phase difference of 180 degrees (180°) appears between the centrifugal force and the displacement of the rings 37 and 38, and the rings 37 and 38 move to a location symmetrical to the location of the imbalance with respect to the axis of rotation due to counter-balanced centrifugal force, i.e. the operating force to offset the imbalance. As a result, the motor rotates stably about the rotational axis of the motor that coincides with the axis of the shaft 29.

Figure 2:
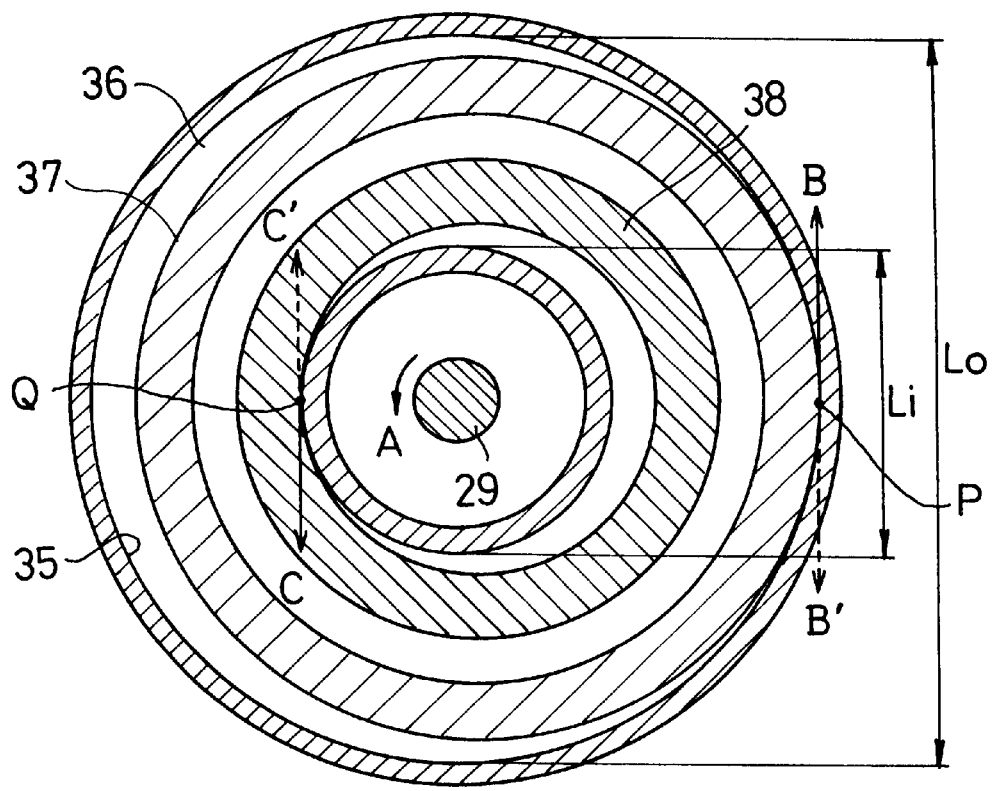
FIG. 2 is a schematic view illustrating the operation of a balancer of the disk drive motor according to the present invention shown in FIG. 1.

As shown in FIG. 2, the outer peripheral surface of the first ring 37 is in contact with the surface of the outer peripheral side wall defining the annular space 36, while the inner peripheral surface of the second ring 38 is in contact with the surface of the inner peripheral side wall defining the annular space 36 while the motor rotates without imbalance.

When the motor rotates in the direction of arrow A in FIG. 2, frictional force acts on the first ring 37 in the direction of arrow B of FIG. 2, which is tangential at the point of contact P of the first ring 37 and the outer peripheral side wall surface for the annular space 36. As will be apparent, a reactional frictional force, acting in the direction of arrow B', opposite the direction of arrow B, acts on the surface of the outer peripheral side wall surface of the annular space 36. On the other hand, frictional force acts on the second ring 38 in the direction of arrow C in FIG. 2, which is tangential at the point of contact Q of the second ring 38 with the inner peripheral side wall surface for the annular space 36. A reactional frictional force acting in the direction of arrow C', opposite the direction of arrow C, acts on the surface of the inner peripheral side wall surface of the annular space 36.

The frictional forces indicated by arrows B and C act in the opposite direction from each other with respect to the center of gravity of the rotary member, and tend to offset each other. Therefore, the motor rotates stably without run-out of the rotary member as is generated by unstable vibration caused by a frictional force acting in one direction derived from steel balls 19 of the balancer moving to one side in unison.

Since the rings 37 and 38 are movable in a direction perpendicular to the axis of rotation of the motor, the distance through which they move is substantially less than the distance through which the steel balls move along the peripheral walls of the annular space 36. This makes it easier for the balancing members to move to the proper balancing location, thereby attaining a higher degree of balance. In addition, since the balancing members are formed into a ring-shape, unlike the steel balls, they do not move randomly in the annular space 36, whereby noise and vibration do not result. Further, since the frictional forces, generated by contact of the rings 37 and 38 with the surface of the outer peripheral side and inner peripheral side walls of the annular space 36, act in opposite directions with respect to the axis of rotation of the motor and thus counter-balanced each other, the motor rotates stably without occurring run-out during high-speed rotation.

A description will now be given of the second embodiment of the present invention with specific reference to FIGS. 3 and 4. In the figures, the same reference numerals as those used in FIGS. 1 and 2 are employed to denote parts or components of the second embodiment which are the same or equivalent to those of the first embodiment. Details of such parts are not repeated.

Figure 3:
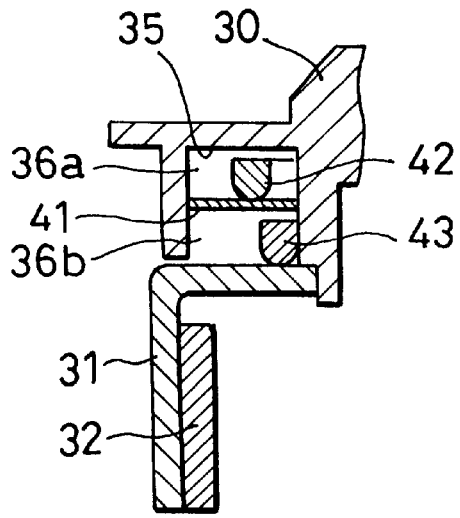
FIG. 3 is a partial sectional view of a second embodiment of the disk drive motor according to the present invention.

In the second embodiment, as shown in FIG. 3, the annular space 36 is divided into an upper portion 36a and a lower portion 36b by an annular partition plate 41. A ring 42, used as a first balancing member, is accommodated in the upper portion 36a of the annular space 36 and a ring 43, used as the second balancing member, is accommodated in the lower portion 36b of the annular space 36.

Figure 4:
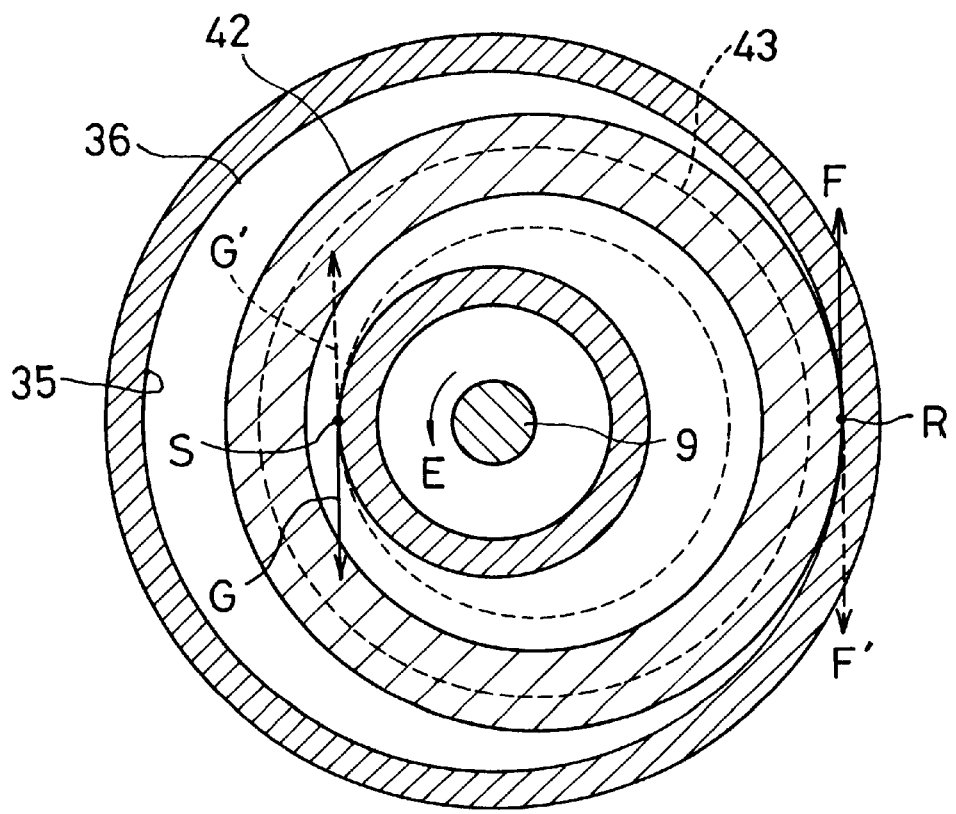
FIG. 4 is a schematic view illustrating the operation of a balancer of the disk drive motor according to the present invention shown in FIG. 3.

As shown in FIG. 4, same as with the first ring 37 shown in FIG. 2, the diameter of the ring 42 is larger than the outside diameter of the inner peripheral wall of the annular space 36, but smaller than the inside diameter of the outer peripheral wall of the space 36. Furthermore, the outer peripheral surface of the ring 42 is in contact with the surface of the outer peripheral wall for the annular space 36.

Also as shown in FIG. 4, as with the ring 38 shown in FIG. 2, the diameter of the ring 43 is larger than the outside diameter of the inner peripheral wall of the annular space 36, but smaller than the diameter of the ring 42. The inner peripheral surface of the ring 43 is in contact with the surface of the inner peripheral wall surface for the annular space 36.

Further, as with the above-described first ring 37 and second ring 38, the ring 42 and the ring 43 are made of metal or resin and the bottom surface of each of the rings is curved to reduce friction.

As shown in FIG. 4, when the motor rotates in the direction of arrow E of FIG. 4, frictional force acting in the direction of arrow F of FIG. 4, which is tangential at the point of contact R of the ring 42 with the surface of the outer peripheral side wall of the annular space 36, acts on the ring 42. Reactional frictional force acting in the direction of arrow F', which is opposite to the direction of arrow F, acts on the outer peripheral side surface of the annular space 36. On the other hand, frictional force acting in the direction of arrow G of FIG. 4, which is tangential at the point of contact S of the ring 43 with the surface of the inner peripheral side wall of the annular space 36, acts on the ring 43. Reactional frictional force acting in the direction of arrow G', which is opposite to the direction of arrow G, acts on the surface of the inner peripheral side wall of the annular space 36.

As above, the frictional forces, which act in opposite directions indicated by arrows F and G, tend to offset each other. This prevents generation of unstable vibration so that the motor rotates stably without run-out.

Thus, the second embodiment provides effects similar to those of the first embodiment of the present invention.

According to both the foregoing first and second embodiments of the present invention, the balancer can be made compact by forming the annular space 36 between the lower surface of the turntable 30 and the upper surface of the base portion of the yoke 31 without sacrificing the structure of the main portions of the motor, such as the rotor magnet 32 and the stator 8. The annular space 36 may, however, be formed at other locations on other parts of the motor. Therefore, location may be appropriately selected for the annular space 36, such as within the rotor 31 or between the rotor magnet 32 and the stationary member 21, taking into consideration, the position where mass imbalance occurs when the motor is rotating.

A description will now be given of the third embodiment of the present invention with reference to FIG. 5.

Figure 5:
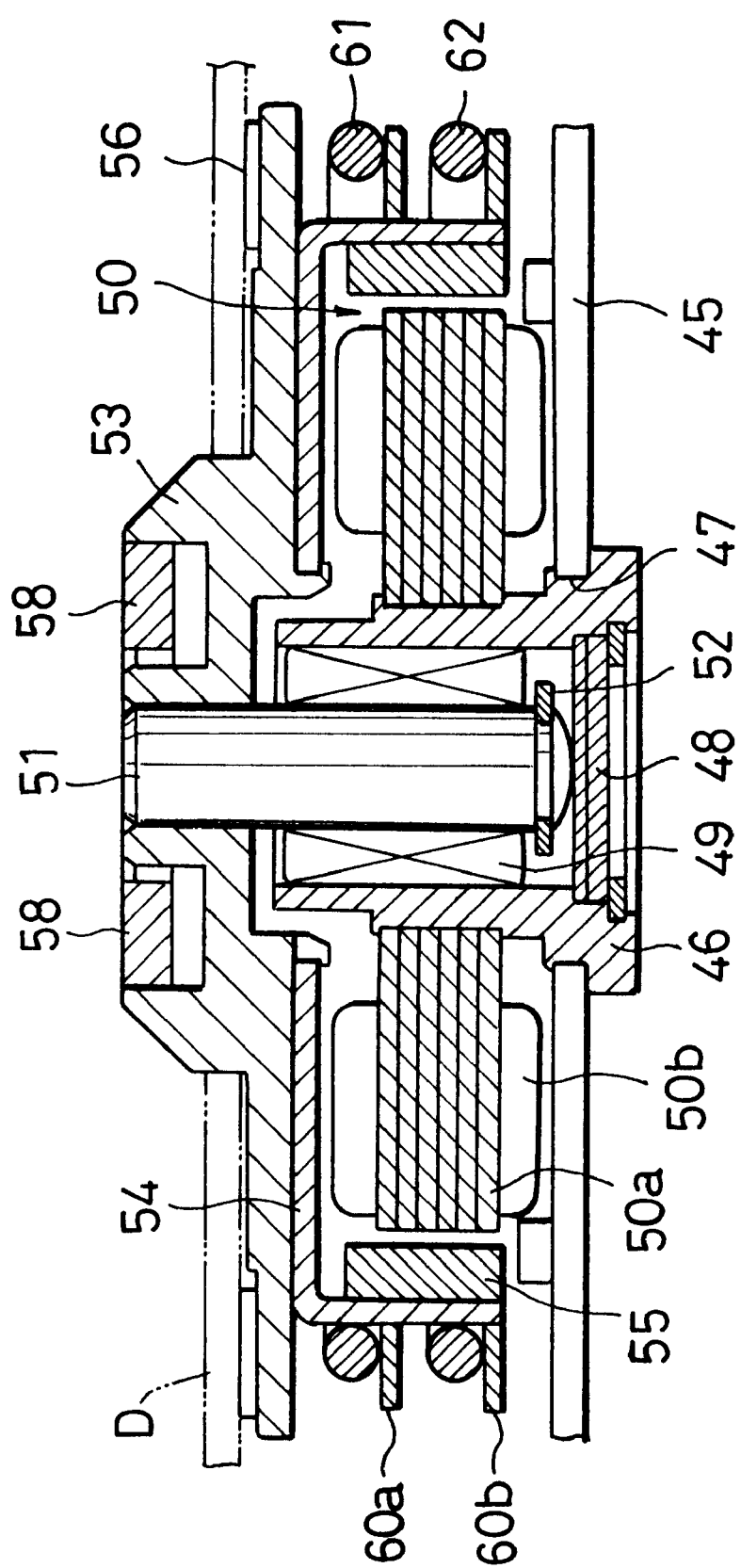
FIG. 5 is a sectional view of a third embodiment of the disk drive motor according to the present invention.
Figure 6:
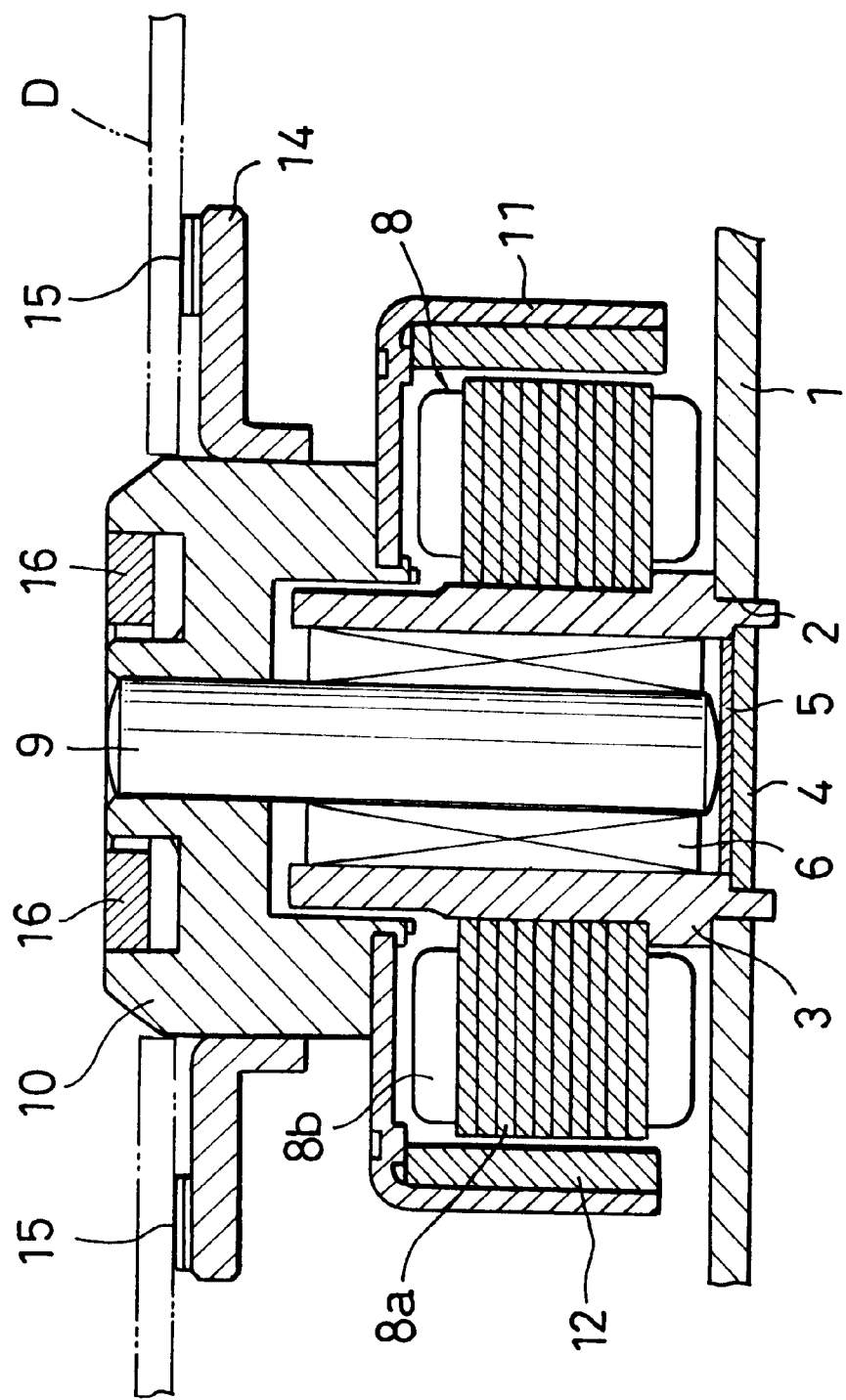
FIG. 6 is a sectional view of a conventional prior art disk drive motor.
Figure 7:
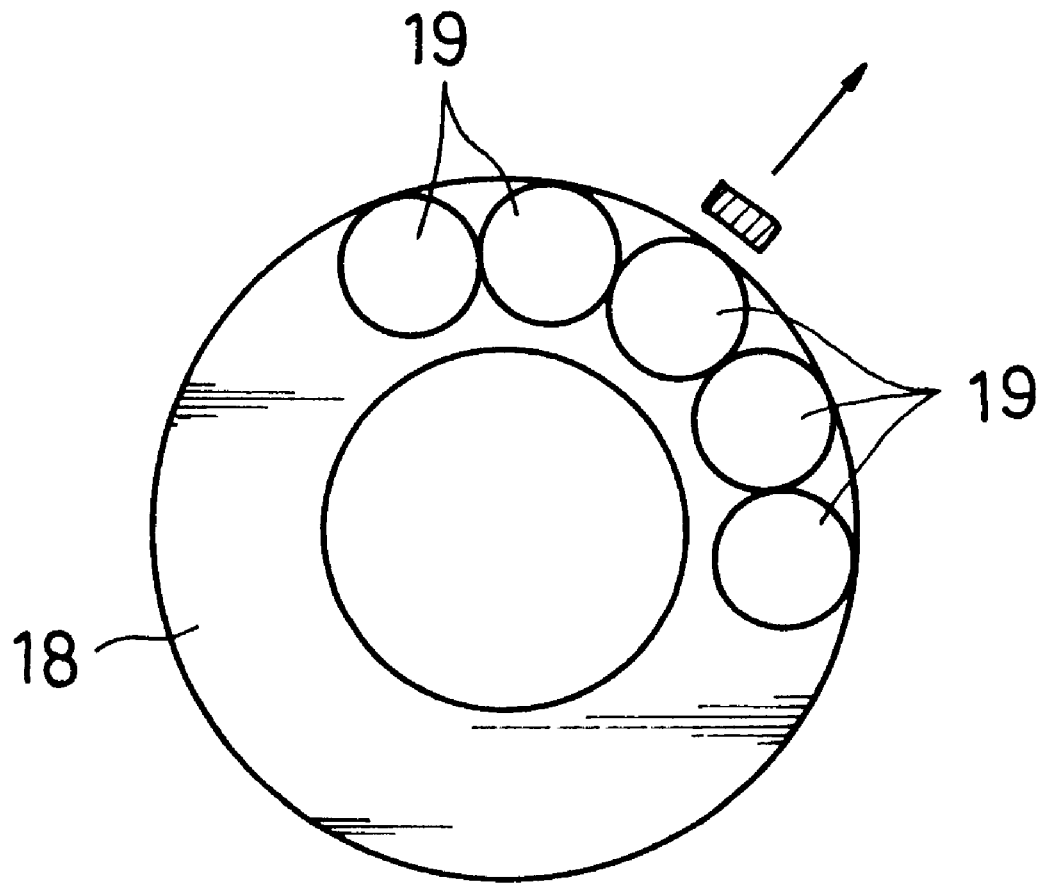
FIG. 7 is a schematic view of a conventional prior art balancer.

Referring to FIG. 5, reference numeral 45 denotes a stationary member such as a printed circuit board affixed to a chassis. Reference numeral 46 denotes a cylindrical sleeve member, a stationary member which is secured at its lower end to an edge defining an opening 47 formed in the stationary member 45. Reference numeral 48 denotes a double-structured thrust bearing which is disposed to cover the opening at the bottom of the sleeve member 46. Reference numeral 49 denotes a sleeve bearing affixed to the inner peripheral surface of the sleeve member 46.

Also referring to FIG. 5, reference numeral 50 denotes a stator including a core 50a fixed to the outer surface of the sleeve member 46 and coils 50b wound around the core 50a. Reference numeral 51 denotes a shaft as a rotary member held in the sleeve bearing 49 such that its lower end is in contact with the thrust bearing 48 and its upper end protrudes upwardly beyond the sleeve member 46. Reference numeral 52 denotes a ring which is attached to the lower end portion of the shaft 51 below the sleeve bearing 49 for preventing the shaft 51 from coming out. Reference numeral 53 denotes a turntable made of a nonmagnetic material such as aluminum, and secured to the upper end portion of the shaft 51 to work as a rotary member. Reference numeral 54 denotes a rotary yoke made of a magnetic material such as iron. Reference numeral 55 denotes a rotor magnet also serving as a part of a rotary member.

The yoke 54 has a disk-shaped base portion and a cylindrical portion which is integrally formed with the base portion and extends downward from the outer peripheral end of the base portion. The sleeve member 46 is positioned within an opening formed at the central portion of the base portion of the yoke 54. The inner peripheral edge of the base portion defining the opening is secured to a lower end portion of the turntable 53. The rotor magnet 55 is affixed to the inner peripheral surface of the cylindrical portion of the yoke 54 so as to oppose the stator 50. A recording disk D, such as a CD-ROM, is mounted on the upper surface of the turntable 53 through buffer members 56.

Further, numeral 58 of FIG. 5 denotes a clamp magnet mounted on the turn table 53 such that the upper surface of the clamp magnet 58 is substantially flush with the top surface of the turntable 53. The clamp magnet 58 is adapted to magnetically attract disk pressing means (not shown) provided on the disk driving device, thereby stably fixing the recording disk D.

Further with reference to FIG. 5, reference numerals 60a and 60b denote two annular parallel supporting plates, mounted one above another, outside of the cylindrical portion of the yoke 54. Reference numeral 61 denotes a ring which works as the first balancing member and is disposed on the supporting plate 60a. Reference numeral 62 denotes a ring which works as the second balancing member and is disposed on the supporting plate 60b. The inner diameters of the rings 61 and 62 are greater than the outer diameter of the cylindrical portion of the yoke 54 and a part of the inner peripheral portion of each of the rings 61 and 62 is in contact with the outer peripheral surface of the cylindrical portion of the yoke 54.

When the motor rotates, the rings 61 and 62 rotate on their respective supporting plates 60a and 60b. At the rated rotational speed above the resonance speed of the motor, a phase difference of 180 degrees (180°) appears between the centrifugal force and the displacement of the rings 61 and 62, and the rings 61 and 62 are moved in the directions that offset the imbalance, so that they move to a position symmetrical with respect to the axis of rotation, to the position where the imbalance is taking place thereby correcting the imbalance. As a result, the motor rotates stably about the rotational axis of the motor that coincides with the axis of the shaft 51.

Similarly with the first and second embodiments of the present invention, the motor stably rotates without causing run-out of the rotary member during high-speed rotation. In addition, the rings 61 and 62 are disposed outside of the cylindrical portion of the yoke 54, so that it is unnecessary to provide a space inside the motor in order to accommodate the balancing members. As a result, the motor can be made thinner and also be facilitated to manufacture the component parts.

It is to be noted that the cylindrical portion of the yoke 54 may be formed to have stepped portions with different outside diameters by varying the wall thickness of the cylindrical portion such that the rings 61 and 62, having different diameters, are disposed on the cylindrical portion at thin and thick portions through respective supporting plates.

Further, contact and frictional loss generated between the rings 61 and 62 and their respective supporting plate 60a and 60b may be reduced by disposing a magnet between the opposing surface of the rings 61 and 62 to cause magnetic repulsion force acting on the rings.

Lubricating and wear-resistant material (i.e. polytetrafluoroethylene resin, such as Teflon (trademark of Du Pont)) may be used for the rings 37, 38, 42, 43, 61 and 62 of the disk drive motors of the present invention so as to form at least a contact with the rotary member for ensuring smooth rotation and durability of the balancing members.

In the above-described embodiments, a disk drive motor having a shaft such as 29 and 51 that rotates was taken as an example. However, other types of motors may also be used, such as an inner rotor type motor having a stationary shaft.

In addition, in the above-described embodiments, the rotary member includes the turntable 30, the yoke 31 and the rotor magnet 32 as an example. However, the rotary member may be constituted by, for example, the rotor magnet 32 directly attached to the rotary member made of magnetized material (i.e. iron) without using the yoke 31 or by other component parts. Thus, the balancing member may be on either of those components of the rotary member, so far as it functions to eliminate or reduce the run-out of the rotor and disk.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A disk drive motor comprising:
   a stationary member;
   a rotary member rotatable relative to the stationary member and including a rotor magnet, the rotary member being formed with an at least one coaxial annular space having inner and an outer walls partially defining the annular space;
   a stator disposed on the stationary member so as to oppose the rotor magnet;
   a bearing means interposed between the stationary member and the rotary member for rotatable supporting the rotary member; and
   a first and a second ring shaped balancing members each having an inner peripheral surface and an outer peripheral surface disposed within the annular space in such manner that the members are prevented from contacting each other and are moveable in the direction transverse to the rotational axis of the motor, the inner peripheral surface of one of the first and second balancing members being in contact with a part of the inner peripheral wall of the annular space and the outer peripheral surface of the other of the balancing members being in contact with a part of the outer peripheral wall of the annular space.

2. A disk drive motor according to claim 1, wherein the annular space is formed co-axilly with the rotary member for receiving the first and second balancing member therein, the first balancing member has a diameter smaller than the outer diameter of the outer peripheral wall of the annular space with the outer peripheral surface of the first balancing member being in contact with the inner circumferential surface of the outer peripheral wall, and the second balancing member has a diameter larger than the inner diameter of the inner peripheral wall of the annular space with the inner peripheral surface of the second balancing member being in contact with the outer circumferential surface of the inner peripheral wall.

3. A disk drive motor according to claim 2, wherein the annular space is formed on an outer circumferential surface of the rotary member.

4. A disk drive motor according to claim 2, wherein the first and second balancing members are disposed so as to be aligned with each other in the radial direction.

5. A disk drive motor according to claim 2, wherein the annular space is separated in the axial direction by a plate member disposed at an axially intermediate portion of the inner and outer peripheral walls of the annular space, one of the first and the second balancing members is received within the axially upper portion of the annular space and the other of the balancing members is received within the axially lower portion of the annular space.

6. A disk drive motor according to claim 1, wherein the rotor magnet is fixed to the rotary member through a yoke, the yoke including a disk-shaped plate portion having a central opening and a hollow cylindrical portion depending from a radially outward portion of the disk-shaped plate portion, the yoke is fixed to the rotary member at an inner edge defining the central opening so as to be in contact with an upper surface of the disk-shaped plate portion and a lower surface of the rotary member.

7. A disk drive motor according to claim 5, wherein the lower surface of the rotary member is provided with an annular groove and the upper surface of the disk-shaped plate portion covers an opening of the annular groove, so as to form the annular space.

8. A disk drive motor according to claim 6, wherein the annular space is formed on the outer circumferential surface of the hollow cylindrical portion of the yoke.

9. A disk drive motor according to claim 1, wherein at least one of the balancing members is formed by an eccentric ring member.

10. A disk drive motor according to claim 9, wherein part of the eccentric ring member is formed by using a different material.

11. A disk drive motor according to claim 1, wherein part of the balancing members have lubrication and wear resistance characteristics.

12. A disk drive motor according to claim 1, wherein a magnet is disposed on each balancing member such that the members are biased by magnetic repulsion of the magnets in opposite directions.

13. A disk drive motor comprising:
   a base having a cylindrical sleeve member;
   a shaft inserted within the cylindrical sleeve member;
   a disk-shaped turntable fixed on one end portion of the shaft and rotatable relative to the base;
   a bearing means interposed between the shaft and the cylindrical sleeve member for rotatably supporting the turntable and the shaft;

a yoke having a circular plate portion with a central opening and a hollow cylindrical portion depending from a radially outward end portion of the circular plate portion, the yoke fixed to the turntable so as to be in contact with a lower surface of the turntable and an upper surface of the circular plate portion;

a rotor magnet secured to an inner peripheral surface of the hollow cylindrical portion of the yoke;

a stator including a core and coils wound around the core and disposed to oppose the rotor magnet;

the lower surface of the turntable having an annular groove, which opens axially toward the base, the opening of the annular groove being covered by the upper surface of the circular plate portion so as to form an annular space; and first and second ring shaped balancing members having different diameters accommodated within the annular space so as to be moveable in a direction transverse to the rotational axis of the motor, at least one of the inner and outer peripheral surface of the first and second balancing members being in contact with part of the surfaces of the annular groove and the circular plate portion.

14. A disk drive motor according to claim 13, wherein the annular space is separated in the axial direction by a plate member disposed on the axially intermediate portion of the annular space and the first and the second balancing members are received within the axially upper and the lower portions of the annular space, respectively.

15. A disk drive motor according to claim 13, wherein at least one of the first and second balancing members is formed by an eccentric ring member.

16. A disk drive motor according to claim 15, wherein part of the eccentric ring member is formed by using a different material.

17. A disk drive motor according to claim 13, wherein at least a part of the first and the second balancing members have lubrication and wear resistance at the contacting portion with the surfaces of the annular groove and the circular plate portions.

18. A disk drive motor according to claim 13, wherein a magnet is disposed on each of the balancing members such that the balancing members are biased by a magnetic repulsion of the magnet in the opposite direction with each other.

* * * * *